US009225411B2

(12) United States Patent
Matsuo et al.

(10) Patent No.: US 9,225,411 B2
(45) Date of Patent: Dec. 29, 2015

(54) PHASED ARRAY TRANSMISSION DEVICE

(71) Applicant: Panasonic Corporation, Osaka (JP)

(72) Inventors: Michiaki Matsuo, Osaka (JP); Junji Sato, Tokyo (JP); Hirohito Mukai, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 14/402,223

(22) PCT Filed: Mar. 12, 2014

(86) PCT No.: PCT/JP2014/001413
§ 371 (c)(1),
(2) Date: Nov. 19, 2014

(87) PCT Pub. No.: WO2014/141705
PCT Pub. Date: Sep. 18, 2014

(65) Prior Publication Data
US 2015/0139352 A1 May 21, 2015

(30) Foreign Application Priority Data

Mar. 14, 2013 (JP) ................................ 2013-052224

(51) Int. Cl.
*H04L 27/00* (2006.01)
*H04B 7/06* (2006.01)
*H04B 17/12* (2015.01)
*H01Q 3/26* (2006.01)

(52) U.S. Cl.
CPC ............ *H04B 7/0617* (2013.01); *H01Q 3/2605* (2013.01); *H01Q 3/267* (2013.01); *H04B 17/12* (2015.01)

(58) Field of Classification Search
CPC .............. H04B 7/08; H04B 7/10; H01Q 3/26; H01Q 3/36; H01Q 3/267; H01Q 21/061; H01Q 3/38; H01Q 3/2605; H04W 52/42; G01S 13/288; G01S 2013/0254; H04H 20/33
USPC ................... 375/295, 299; 342/368, 372, 380
See application file for complete search history.

(56) References Cited

U.S. PATENT DOCUMENTS

| 5,940,029 A * | 8/1999 | Ninomiya et al. ............. 342/372 |
| 7,106,249 B2 * | 9/2006 | Kubo et al. .................... 342/174 |
| 7,312,751 B1 * | 12/2007 | Voyce et al. .................. 342/380 |
| 2009/0322610 A1 * | 12/2009 | Hants et al. ................... 342/372 |

(Continued)

FOREIGN PATENT DOCUMENTS

| JP | 2002-076743 A | 3/2002 |
| JP | 2005-348236 A | 12/2005 |

(Continued)

OTHER PUBLICATIONS

International Search Report for Application No. PCT/JP2014/001413 dated Jun. 17, 2014.

*Primary Examiner* — Don N Vo
(74) *Attorney, Agent, or Firm* — Pearne & Gordon LLP

(57) ABSTRACT

Transmission output detectors extract transmission outputs of a plurality of transmission branches, and an inter-branch error detector detects a combined signal level of the transmission outputs of the transmission branches to obtain an error detection signal. A correction controller calculates an amplitude error between the transmission branches based on an error detection signal, and calculates a phase error between the transmission branches based on an error detection signal which is obtained by changing the phases of the transmission branches. A phase controller and an amplitude controller correct the amplitude error and the phase error.

7 Claims, 5 Drawing Sheets

(56) References Cited

U.S. PATENT DOCUMENTS

2011/0109507 A1* 5/2011 Warnick .................. 342/368
2014/0192923 A1 7/2014 Matsuo et al.

FOREIGN PATENT DOCUMENTS

| JP | 2006-279901 A | 10/2006 |
|----|---------------|---------|
| WO | 2013/018365 A1 | 2/2013 |

* cited by examiner

PHASED ARRAY TRANSMISSION DEVICE

TECHNICAL FIELD

The disclosure relates to a phased array transmission apparatus which transmits a radio signal from a phased array antenna.

BACKGROUND ART

A phased array antenna technique has been widely used in the field of wireless communication and radar. When the technique is applied to a transmission apparatus, formation of beam directionality and electronic scanning of a beam are enabled. In the field of wireless communication, for example, a beam is formed to improve the antenna gain and scanned with the result that the range of communication area can be widened, or the cover area can be dynamically controlled in a base station in accordance with the number of accommodated users. In an application to a radar, when a beam of high directionality formed by a phased array antenna is radiated to a detection object from a transmission apparatus, furthermore, it is possible to suppress reflection (clutter reflection) from a non-detection target, and there is an effect of improving the detection accuracy with respect to the position of an object.

In a transmission apparatus using a phased array antenna technique, a plurality of antenna elements are arranged in an array form, and the phases and amplitudes of a plurality of parallel transmission systems (hereinafter, referred to as "transmission branches") which supply electric power to the respective antenna elements are adequately controlled, whereby a desired directionality gain as an antenna can be obtained. In each transmission branch, the phase and the amplitude must be accurately controlled. When an error occurs in the phase or the amplitude, for example, the shape of a beam is collapsed, and therefore the antenna gain of the main beam is lowered, or a strong radiation beam is formed in an unwanted direction, thereby causing degradation of the system characteristics.

In wireless transmission using a phased array antenna, in the case where an error occurs in control of amplitudes and phases between transmission branches, it is requested to provide a technique for correcting the error. The error may be caused by various factors such as performance variations of components used for circuit mounting, unevenness of processes for integrated circuits, variations due to usage environments (for example, the temperature), or performance variations of power sources used in respective transmission branches.

In wireless transmission using a phased array antenna, as a technique for correcting a phase error and an amplitude error, for example, related art examples disclosed in Patent Literatures 1 to 3 are known.

The array antenna transmission and reception apparatus of Patent Literature 1 has a configuration where RF transmitters (wireless transmitters) which supply electric power respectively to a plurality of antennas are disposed to form a beam. RF receivers for calibration (wireless receivers for calibration) which detect amplitude and phase errors of respective transmission branches, a fast Fourier transformer, and a calibration value measuring section are separately disposed. In order to realize error correction, transmission signals of the respective transmission branches which are extracted by a changeover switch are sequentially received and processed to calculate a calibration value for error detection and correction. Then, a feed back to the respective transmission branches is performed based on the calculated calibration value, thereby correcting the phase error and the amplitude error.

The communication apparatus of Patent Literature 2 operates in a similar manner as that of Patent Literature 1. In a calibration section for detecting amplitude/phase errors of respective transmission branches, an RF·IF section (radio frequency/baseband frequency converter), a detector, and a calibration weight calculator are separately disposed. Transmission signals of the transmission branches which are extracted by a coupler are sequentially received and processed, a calibration value for error detection and correction is calculated, and the error is corrected.

The phased array antenna device disclosed in Patent Literature 3 includes: a correction phase storage device which stores correction phase information; and a correction phase indicating circuit which acquires information relating to a delay time of each real-time delay phase shifter, and which indicates a correction phase according to the delay time of each real-time delay phase shifter, and corrects a phase error between respective transmission branches by the phase shifter and a delay device.

CITATION LIST

Patent Literature

Patent Literature 1: JP-A-2005-348236
Patent Literature 2: JP-A-2006-279901
Patent Literature 3: JP-A-2002-76743

SUMMARY OF INVENTION

Technical Problem

In a conventional phased array transmission apparatus, a reception system for calibration which is used for detecting phase and amplitude errors of respective transmission branches is disposed, and therefore there is a problem in that the circuit size and power consumption are increased. In wiring for mounting a circuit of the reception system for calibration, furthermore, errors in detection of the amplitude and the phase may sometimes occur.

It is an object of the disclosure to, in wireless transmission using a phased array antenna, enable phase and amplitude errors of a transmission signal between transmission branches to be corrected by a simple configuration in which an increase in circuit size or power consumption is suppressed, and which is easily mounted.

Solution to Problem

The phased array transmission apparatus of the disclosure includes a first transmission branch and a second transmission branch, each having: a transmitter which transmits a transmission signal at a radio frequency; a phase adjuster which adjusts a phase of the transmission signal; an amplitude adjuster which adjusts an amplitude of the transmission signal; and a transmission output detector which extracts a part of an output of the transmitter, and the phased array transmission apparatus includes: an inter-branch error detector including: a signal combiner which combines outputs of the transmission output detectors of the first transmission branch and the second transmission branch, with each other; a detector which detects a level of an output of the signal combiner; and an AD converter which converts an analog voltage from the detector into a digital value; a correction controller which detects phases and amplitudes of the first transmission branch and the second transmission branch according to an output from the inter-branch error detector; a phase controller which controls the phase adjuster based on a result of phase detection by the correction controller; and an amplitude controller which controls the amplitude adjuster based on a result of amplitude detection by the correction controller.

Advantageous Effects of Invention

According to the disclosure, in wireless communication using a phased array antenna, phase and amplitude errors of transmission signals between transmission branches can be corrected by a simple configuration in which an increase in circuit size or power consumption is suppressed, and which is easily mounted.

DESCRIPTION OF EMBODIMENTS

Background of Embodiments of Disclosure

Figure 1:
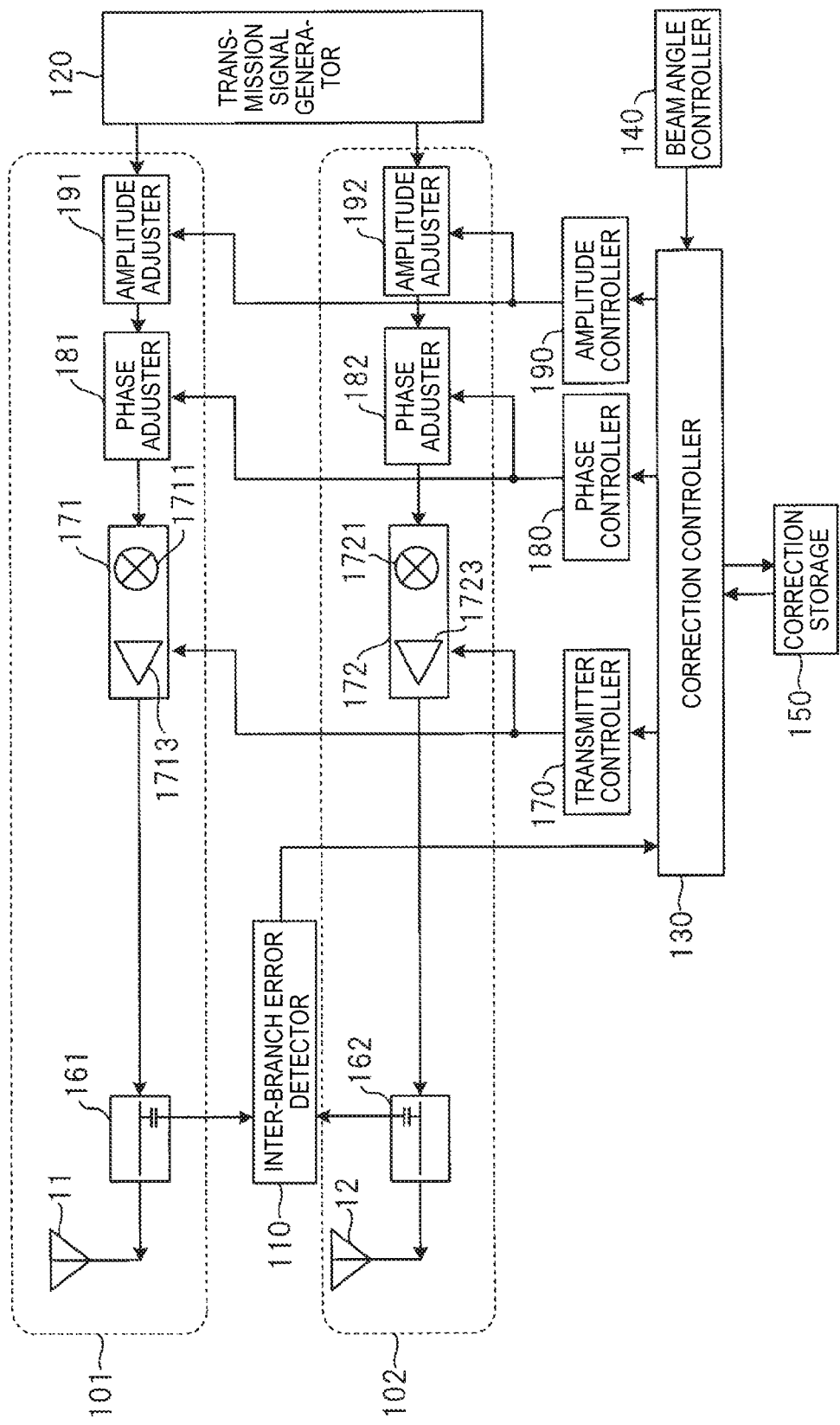
FIG. 1 is a block diagram showing the configuration of a phased array transmission apparatus of a first embodiment of the disclosure.

Prior to description of embodiments of the phased array transmission apparatus of the disclosure, first, problems of the technique for correcting phase and amplitude errors in a phased array antenna will be described.

In the above-described related art examples disclosed in Patent Literatures 1 and 2, as a reception system for calibration, a circuit which down-converts loopback signals of the transmission branches, and which detects phase and amplitude errors by digital signal processing is additionally disposed. Similarly with a circuit of a signal reception system, a reception system for calibration is a circuit which receives and processes a transmission RF signal (transmission radio signal), and has a problem in that the circuit size and the power consumption are increased.

When, in wirings through which the loopback signals of the transmission branches are input to the reception system for calibration, a difference occurs in the wiring length or added parasitic elements (electrical couplings with other circuits), moreover, this causes an error to occur in results of amplitude and phase detections. In the case where the RF signal (radio signal) is a high-frequency signal such as a microwave or a millimeter-wave, particularly, the error cause due to the wirings of the reception system for calibration is larger. A countermeasure such as that wirings for the loopback signals are made equal to each other in length, or that a shield is disposed must be taken, and there is a problem in that the circuit is hardly mounted.

In the above-described related art example of Patent Literature 3, furthermore, means for detecting the amplitudes and phases of transmission signals which are actually transmitted from antennas is not disposed. In the case where errors of the amplitudes and phases of transmission signals are time variant due to various factors including the temperature, it is difficult to accurately correct the amplitudes and the phases.

In view of the above-discussed problems in rapid rising of the current output, the disclosure provides a phased array transmission apparatus which can be realized by a simple configuration that is easily mounted, and which can accurately correct phase and amplitude errors.

Embodiments of Disclosure

Hereinafter, embodiments of the phased array transmission apparatus of the disclosure will be described. In the following embodiments, the identical configurations are denoted by the same reference numerals, and their description will be omitted because of duplication. Hereinafter, a wireless transmission apparatus which uses the phased array antenna technique (wireless transmission apparatus using a phased array antenna) is referred to as "phased array transmission apparatus."

First Embodiment

FIG. 1 is a block diagram showing the configuration of a phased array transmission apparatus according to a first embodiment of the disclosure. In the first embodiment, a configuration example in which two transmission branches are provided as a plurality of parallel transmission systems is shown. The disclosure is applicable also to a configuration which has three or more transmission branches.

The phased array transmission apparatus of the first embodiment includes transmission branches 101, 102, an inter-branch error detector 110, a transmission signal generator 120, a correction controller 130, a beam angle controller 140, a correction storage 150, a transmitter controller 170, a phase controller 180, and an amplitude controller 190.

The transmission branches 101, 102 have functions of supplying transmission signals to a plurality of antennas in the phased array transmission apparatus, up-converting the transmission signals to radio frequency signals, and controlling the phases and the amplitudes. The transmission branches 101, 102 have the same configuration.

That is, the transmission branch 101 includes an antenna section 11, a transmission output detector 161, a transmitter 171, a phase adjuster 181, and an amplitude adjuster 191, and the transmission branch 102 includes an antenna section 12, a transmission output detector 162, a transmitter 172, a phase adjuster 182, and an amplitude adjuster 192.

The antenna sections 11, 12 radiate a transmission signal into the space, and constitute an array antenna by arrangement of a plurality of antennas. In a phased array antenna, the shape of a transmission beam is theoretically determined by the directionality of a single antenna, the arrangement intervals of a plurality of antennas, and the levels and phases of transmission signals supplied to the antennas.

The transmission output detectors 161, 162 are disposed in the vicinities of antenna ends in front of the respective antenna sections 11, 12, and have a function of extracting a part of the supplied transmission signal. In consideration of level reduction and quality degradation of the transmission signal, and an influence to the antenna end output impedance, the level of the extraction signal is set to be about one-fifth or smaller of the transmission signal. A specific configuration of the transmission output detectors 161, 162 may be realized by, for example, coupling a transmission line for the transmission signal with a distributed coupled line or a transformer which is electric-field coupled or magnetic-field coupled, or a passive circuit such as a capacitor having a relatively small capacitance or a choke coil having a large inductance.

The transmitters 171, 172 include high frequency circuits (RF circuits) such as power amplifiers 1713, 1723 and mixer circuits 1711, 1721, and have an amplification function of up-converting the transmission signal to a radio frequency band to obtain an output level which is required in transmission.

The phase adjusters 181, 182 have a function of adjusting the phase of the transmission signal in each of the transmission branches 101, 102, and are realized by a circuit such as a phase shifter, a delay device, or the like. In the phased array transmission apparatus, a phase which is necessary in each transmission branch is theoretically determined from required specifications such as the shape and direction of a transmission beam, and the amount of side lobe suppression, and the phase is adjusted by the phase adjusters 181, 182 to obtain a necessary phase shift amount.

The adjustment of the phase of the transmission signal may be performed on either of a baseband signal or a radio frequency signal. Alternatively, the phase adjustment may be performed on a local oscillation signal which is used in up-conversion of a baseband signal, or on an intermediate frequency in the case where the transmitters use the intermediate frequency.

Namely, the phase adjusters 181, 182 may be disposed in a baseband circuit as in the illustrated example, or in a circuit of a radio frequency band. That is, the phase adjusters may be disposed inside the transmitters 171, 172. Alternatively, the phase adjusters may be disposed between the transmission output detectors 161, 162 and the transmitters 171, 172, or between local oscillation signal sources (not shown) and the up-conversion mixer circuits 1711, 1721 provided in the transmitters 171, 172.

The amplitude adjusters 191, 192 have a function of adjusting the amplitude of the transmission signal in each of the transmission branches 101, 102, and are realized by a circuit such as a variable gain amplifier or a variable attenuator. In the phased array transmission apparatus, an amplitude which is necessary in each transmission branch is theoretically determined from required specifications such as the shape and direction of a transmission beam, and the amount of side lobe suppression, and the amplitude is adjusted by the amplitude adjusters 191, 192 to obtain a necessary signal level (amplitude).

The adjustment of the amplitude of the transmission signal may be performed on either of a baseband signal or a radio frequency signal. Alternatively, the amplitude of the transmission signal may be adjusted by performing amplitude adjustment on a local oscillation signal which is used in up-conversion of a baseband signal.

Similarly with the phase adjusters 181, 182, namely, the amplitude adjusters 191, 192 may be disposed in a baseband circuit as in the illustrated example, or disposed in a circuit of the radio frequency band. That is, the amplitude adjusters may be disposed inside the transmitters 171, 172, disposed between the transmission output detectors 161, 162 and the transmitters 171, 172, or disposed between the local oscillation signal sources (not shown) and the up-conversion mixer circuits 1711, 1721 provided in the transmitters 171, 172. Alternatively, the amplitude adjusters may be realized by gain adjustment conducted by controlling the biases of the power amplifiers 1713, 1723 which are inside the transmitters 171, 172.

Furthermore, the arrangement order of the transmitters 171, 172, the phase adjusters 181, 182, and the amplitude adjusters 191, 192 are not limited to the illustrated order, and may be arranged in any order.

The inter-branch error detector 110 detects information relating to the output levels (amplitudes) of the transmission signals of the transmission branches 101 and 102, and the phase difference of the two signals, based on the signals supplied from the transmission output detectors 161 and 162, and outputs it as an error detection signal to the correction controller 130. The inter-branch error detector 110 is disposed between the transmission branch 101 and the transmission branch 102, and connected to the transmission output detectors 161, 162 of the transmission branches 101, 102. The configuration and operation of the inter-branch error detector 110 will be described in detail later.

The transmission signal generator 120 generates a modulated baseband signal to be transmitted, and supplies the same transmission signal to the transmission branches 101, 102 at the same timing.

The beam angle controller 140 calculates the required amplitude and phase shift amounts of the transmission signals in the transmission branches 101, 102, based on the information of the specifications of the beam directionality such as the direction in which the transmission signal is to be radiated, and the suppression ratio of the radiation amount (directional side lobe) in a unwanted direction.

The correction controller 130 calculates error amounts relating to the amplitudes and phases of the transmission branches, based on the error detection signal for the transmission branches 101, 102 which is supplied from the inter-branch error detector 110, and further calculates amplitude and phase control amounts in which the values of the required amplitude and phase shift amounts for the transmission branches 101, 102 that are supplied from the beam angle controller 140 are corrected by the error amounts.

The correction storage 150 stores information relating to the error amounts of the phases and amplitudes of the transmission branches which are calculated by the correction controller 130, or the corrected amplitude and phase shift control amounts. In the case where the correction controller 130 newly calculates error amounts, moreover, the stored information relating to the error amounts or the corrected amplitude and phase shift control amounts is updated. Alternatively, the correction storage 150 may store both the error amounts of the phases and the amplitudes, and the amplitude and phase shift control amounts.

In accordance with instructions from the correction controller 130, the transmitter controller 170 individually turns ON or OFF the outputs of the transmission signals from the transmission branches 101, 102. In the illustrated example, the example in which the transmitter controller 170 controls the transmitters 171, 172 has been described. Alternatively, for example, the transmitter controller 170 may control the transmission signal generator 120, thereby controlling the existence/non-existence of the outputs of the transmission branches 101, 102.

By using the phase shift control amount which is calculated by the correction controller 130, the phase controller 180 controls the phase adjuster 181 of the transmission branch 101 and the phase adjuster 182 of the transmission branch 102. In the case where the phase adjusters 181, 182 change the phase shift amounts by means of an analog voltage value or a digital value, in order to realize the phase shift control amount which is requested by the correction controller 130, for example, the phase controller 180 has a function of conversion to phase shift control signals due to analog voltage values or digital values which are to be given to the phase adjusters 181, 182.

By using the amplitude control amount which is calculated by the correction controller 130, the amplitude controller 190 controls the amplitude adjuster 191 of the transmission branch 101 and the amplitude adjuster 192 of the transmission branch 102. In the case where the amplitude adjusters 191, 192 change the amplitude amounts by means of an analog voltage value or a digital value, in order to realize the amplitude control amount which is requested by the correction controller 130, for example, the amplitude controller 190 has a function of conversion to amplitude control signals due to analog voltage values or digital values which are to be given to the amplitude adjusters 191, 192.

The correction controller 130 and the correction storage 150, and the transmitter controller 170, the phase controller 180, the amplitude controller 190, and the beam angle controller 140 may be realized by digital signal processing using an information processing circuit which includes a processor and a memory, and the functions may be realized by executing a predetermined process conducted by operating a software program in the processor.

Figure 2:
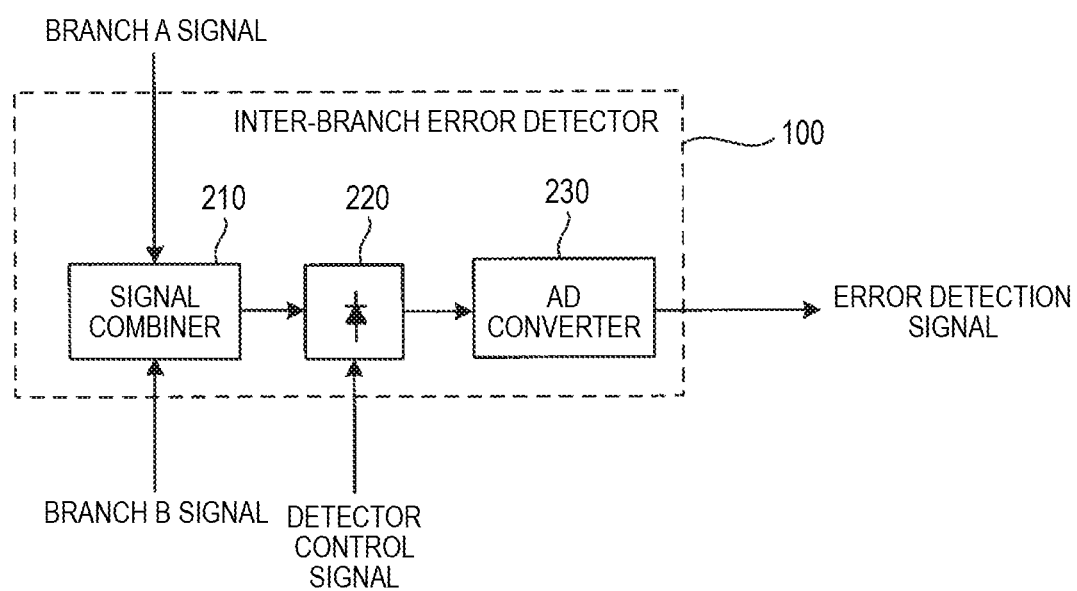
FIG. 2 is a block diagram showing the configuration of an inter-branch error detector.

FIG. 2 is a block diagram showing the configuration of the inter-branch error detector 110 shown in FIG. 1. The inter-branch error detector 110 includes a signal combiner 210, a detector 220, and an AD converter 230.

The signal combiner 210 has a function of adding together two signals or a branch A signal (transmission branch 101) and branch B signal (transmission branch 102) which are supplied from the transmission output detectors 161, 162 shown in FIG. 1. For example, the signal combiner 210 is realized by a passive circuit such as a Wilkinson power combiner which combines powers of two signals, and can ensure separation between the two connected transmission branches. In the output of the signal combiner 210, the addition output has the maximum amplitude under conditions that the two input signals are in phase. On the other hand, the addition output has the minimum amplitude under conditions that the two input signals have reverse phases, that is, the phase difference is 180 deg.

The detector 220 is connected to the output end of the signal combiner 210, and has a function of detecting and outputting (measuring) the output level of the signal combiner 210 in accordance with a detector control signal. The detector 220 can be realized by a simple, small, and lower power consumption circuit such as a squared detector using a diode or an FET. In the detector 220, moreover, an amplifier and a detector may be combined as necessary, whereby the detection performance can be improved.

The AD converter 230 is connected to the output end of the detector 220, and has a function of converting an analog voltage of the detection signal which is output from the detector 220, into an error detection signal having a digital value which can be processed by the correction controller 130. The AD converter 230 is a circuit for DC which converts a DC detection voltage value that is output from the detector 220 as a result of square detection or envelope detection, into a digital value. A circuit which operates at a low speed may be used. In the AD converter 230, namely, a circuit which performs a sampling operation at a speed corresponding to a modulation rate that may be used in the use of demodulating a transmission signal, or a higher speed is not necessary. Therefore, the AD converter 230 can be realized by a simple, small, and lower power consumption circuit.

The procedure of error correction relating to the phase and amplitude errors between the transmission branches in the embodiment will be described.

As a first procedure, the correction controller 130 detects the transmission output levels of the transmission branch 101 and the transmission branch 102. First, the correction controller 130 controls the transmitter controller 170 so as to cause the transmission branch 101 to perform transmission, and the inter-branch error detector 110 so as to detect the transmission signal of the transmission branch 101. Next, the correction controller 130 controls the transmitter controller 170 so as to cause the transmission branch 102 to perform transmission, and the inter-branch error detector 110 so as to detect the transmission signal of the transmission branch 102. As a result, the correction controller 130 knows the actual transmission output levels with respect to the amplitude control amount to the amplitude controller 190 for the transmission branches.

Figure 3:
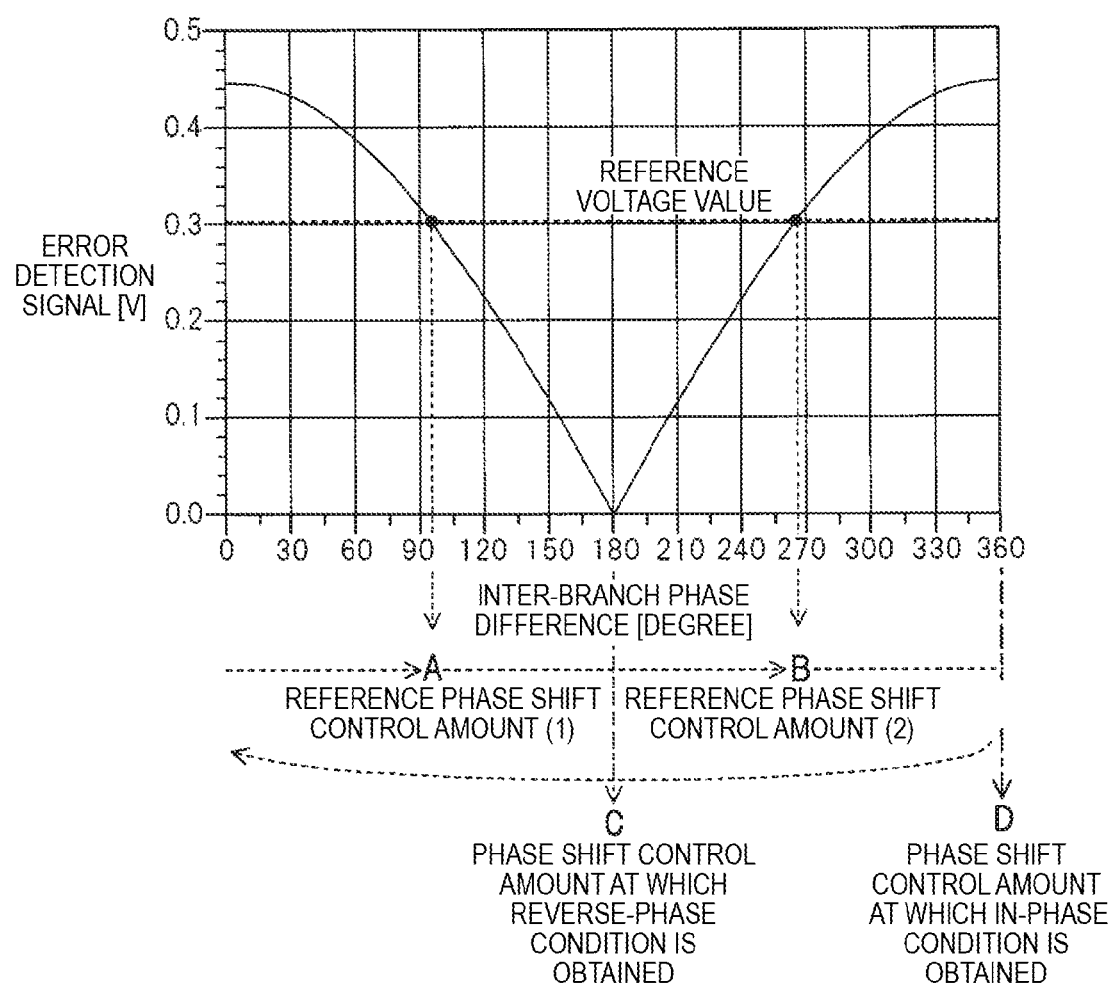
FIG. 3 is a characteristic diagram showing an output from the inter-branch error detector with respect to a phase difference of transmission output signals of two transmission branches.

As a second procedure, the correction controller 130 causes both the transmission branch 101 and the transmission branch 102 to operate, and detects the phase error amount between the transmission branches. The description will be made with reference to FIG. 3. FIG. 3 is a characteristic diagram showing the output from the inter-branch error detector 110 with respect to a phase difference of the transmission output signals from the two transmission branches 101, 102. In FIG. 3, the abscissa indicates the phase difference between the transmission branches, and the ordinate indicates the output of the inter-branch error detector 110. The value which is actually output from the inter-branch error detector 110 is a digital value which has been AD-converted by the AD converter 230. In FIG. 3, in order to facilitate understanding, the value is illustrated as an analog voltage value which is output by the detector 220.

In FIG. 3, when the error detection signal is observed while changing the inter-branch phase difference from 0 deg. to 360 deg., the maximum value is indicated under conditions that the phase difference is in phase, and the minimum value is indicated under conditions that the phase difference is reversed or 180 deg. In setting where a reference value of the error detection signal is set to a reference voltage value of 0.3 V, for example, there exist two phase values (values of phase differences) at which the error detection signal has the reference value.

In FIG. 3, it is seen that the phase shift control amounts in which the inter-branch phase difference is in phase and in reverse phase are obtained by phase shift control amounts at which the error detection signal shows the maximum value and the minimum value. However, the error detection signal has a voltage value of zero or that close to zero under, for example, reverse phase conditions, and therefore it is difficult for the AD converter 230 to accurately detect the error detection signal which is very small, and convert into a digital value. In the case where the phase difference is deviated by 1 deg. from 180 deg., for example, the change of the output is as small as about several millivolts. When a very small voltage difference is to be detected, an AD converting circuit having a large number of bits is required, and there arises a problem in that the circuit size is increased.

In the embodiment, therefore, a reference voltage value at which the accuracy can be easily assured is set in place of detection of a very small voltage value which is hardly detected with respect to the error detection signal, and phase shift control amounts in phase and in reverse phase are obtained from phase shift control amounts having a phase value at which the output of the error detection signal is at the reference voltage value. That is, the symmetry of the error detection signal with respect to the phase difference is used, two points of the same value corresponding to the reference voltage value are detected, the median value of the two detected points are obtained, and phase shift control amounts corresponding to the in-phase condition and the reverse-phase condition are obtained. The reference voltage value is set as, for example, a value in the vicinity of the middle of the output level range of the error detection signal, so that the output level change of the error detection signal with respect to a phase change is large.

First, the correction controller 130 performs adjustment so that the amplitude controller 190 causes the transmission output levels of the transmission branch 101 and the transmission branch 102 to be equal to each other. In an actual apparatus, the adjusted level may contain an error within a predetermined range. Next, the correction controller 130 causes the phase controller 180 to fix the phase shift amount of the phase adjuster 181, and controls the phase shift amount of the phase adjuster 182 so that the phase difference between the transmission branches is changed from 0 deg. to 360 deg.

First and second reference phase shift control amounts (two reference phase shift control amounts (1) and (2)) at which the error detection signal from the inter-branch error detector 110 has a preset reference voltage value are acquired. Finally, phase shift control amounts at which the transmission branches are in phase and in reverse phase are calculated from relationships between the first and second reference phase shift control amounts with respect to the phase adjuster 182, and the output level change of the error detection signal with respect to a phase change.

The phase shift control amounts at which the transmission branches are in phase and in reverse phase can be calculated in the following manner. Referring to FIG. 3, in the case where the preset reference voltage value is 0.3 V and the phase shift control amount with respect to the phase adjuster 182 which is given to the phase controller 180 is changed, for example, A and B are obtained as two reference phase shift control amounts.

In the case where the phase shift control amount is changed from A to B and the output level of the error detection signal is lowered and then raised, it is supposed that the minimum value in the reverse-phase condition exists between them, and the median value between the phase shift control amounts A to B is a phase shift control amount C at which the reverse-phase condition of the inter-branch phase difference is obtained. The median value between the phase shift control amounts B to A is a phase shift control amount D at which the in-phase condition of the inter-branch phase difference is obtained.

On the contrary, in the case where the phase shift control amount is changed from A to B and the output level of the error detection signal is raised and then lowered, it is supposed that the maximum value in the in-phase condition exists between them, and the median value between the phase shift control amounts A to B is the phase shift control amount D at which the in-phase condition is obtained, and the median value between the phase shift control amounts B to A is the phase shift control amount C at which the reverse-phase condition is obtained.

In the above-described second procedure, even in the case where the phase characteristics of the transmitter 171 and the transmitter 172 are different from each other because of various causes of variation, for example, it is possible to acquire the phase shift control amounts for the phase adjuster 182 which are to be given to the phase controller 180, and at which the transmission branch 101 and the transmission branch 102 are caused to be in phase and in reverse phase. When the phase shift control amounts for the phase adjuster 181 and the phase adjuster 182 which are to be given to the phase controller 180 are compared to each other, it is possible to know the phase error amount between the transmitter 171 and the transmitter 172.

Basically, the phase error amounts which are obtained under the in-phase condition and the reverse-phase condition are equal to each other. By the phase error amount which is obtained under one of the conditions, therefore, the appropriateness of that which is obtained under the other condition can be evaluated. However, it may be considered that the phase error amounts under the in-phase condition and the reverse-phase condition are made different from each other by a cause such as non-linear characteristics of the phase adjusters. Phase error amounts may be calculated respectively under the in-phase condition and the reverse-phase condition, as correction data, and, based on the two correction data, correction data can be calculated by interpolation with respect to the phase setting between 0 deg. to 180 deg., based on the two correction data.

In the second procedure, the operation in which the transmission output levels of the transmission branch 101 and the transmission branch 102 are adjusted to the same level has been described. Even when the two output levels are not equal to each other, however, phase shift control amounts in phase and in reverse phase can be obtained by the same procedure. Even in the case where the amplitude error between the transmission branches remains, or where an amplitude difference is intentionally caused in the transmission signals in the operation of forming a beam, therefore, the phase error and the phase shift control amounts can be detected.

In the second procedure, moreover, the example in which the phase difference between the transmission branches is changed from 0 deg. to 360 deg. by adjusting the phase adjuster 182 has been described. However, an operation may be possible in which the phase difference between the transmission branches is changed from 0 deg. to 360 deg. by adjusting the other phase adjuster 181, or both the phase adjusters 181, 182.

As a third procedure, the correction controller 130 calculates a correction value of the amplitude error, and that of the phase error. The correction controller 130 calculates the correction value of the amplitude error of each transmission branch, from a result of the comparison which is performed in the first procedure on each transmission branch, and in which the actual transmission output level is compared with the amplitude control amount to the amplitude controller 190. Furthermore, the correction controller 130 calculates the correction value of the phase error of each transmission branch, from the phase shift control amounts under the in-phase condition and the reverse-phase condition of the inter-branch phase difference which are obtained in the second procedure. Then, the correction controller 130 stores the correction value of the amplitude error, and that of the phase error in the correction storage 150.

The correction storage 150 which is connected to the correction controller 130 stores an amplitude correction table and a phase correction table. The amplitude correction table has information of amplitude correction amounts for the transmission branches which are to be input to the amplitude controller 190, with respect to the required amplitude amount supplied from the beam angle controller 140. With respect to a predetermined amplitude value which is the required amplitude amount, for example, a correction value or amplitude correction amount for each amplitude value is held for each transmission branch. The phase correction table has information of phase correction amounts for the transmission branches which are to be input to the phase controller 180, with respect to the required phase shift amount supplied from the beam angle controller 140. With respect to a predetermined phase value which is the required phase shift amount, for example, a correction value or phase correction amount for each phase value is held for each transmission branch.

The correction controller 130 additionally stores the calculated amplitude and phase correction values in the amplitude correction table and phase correction table which are held by the correction storage 150, and updates the amplitude correction table and the phase correction table each time when the correction values relating to the amplitude error and the phase error are obtained in the first and second procedures.

As a result of the above-described procedures, the correction controller 130 acquires and stores the correction values relating to the phase and amplitude errors of the transmission branches. With respect to the transmission branches 101, 102, the correction controller 130 controls the phase adjusters 181, 182 and the amplitude adjusters 191, 192 to correct the errors of the phase and the amplitude, based on the information of the phase correction table and the amplitude correction table.

As a result, the transmission signals having a desired amplitude and phase in which the error correction has been performed can be output from the transmission branches 101, 102. In the phase and amplitude adjustments for obtaining a desired beam directionality, therefore, it is possible to form a transmission beam in which errors between the transmission branches are suppressed.

In an actual use, values of the errors between the transmission branches may vary according to, for example, an environmental change, and therefore the above-described error correction procedure may be periodically performed.

In the case where the phase error varies according to the output levels of the transmission signals in the transmission branches 101, 102, for example, the phase error may be obtained for each amplitude necessary in an actual use, and then the correction may be performed. In the case where the phase shift characteristics in the phase shifters of the phase adjusters 181, 182 are non-linear, moreover, the phase error may be obtained for each phase shift amount necessary in an actual use, and then the correction may be performed.

In the first embodiment, as described above, the inter-branch error detector 110 is disposed between the transmission branch 101 and the transmission branch 102, the correction controller 130 calculates phase and amplitude errors between the plurality of transmission branches, based on the error detection signal output from the inter-branch error detector 110, and the phase controller 180 and the amplitude controller 190 correct the phase and amplitude errors. The inter-branch error detector 110 can be configured by a signal combiner, detector, and AD converter which can be mounted in a small size and low power. Therefore, it is possible to realize a phased array transmission apparatus which can detect and correct errors of amplitude and phase characteristics between two transmission branches by using a simple configuration and simple procedures.

Moreover, the inter-branch error detector 110 is configured by a small circuit. In the case where circuits are mounted on an integrated circuit or a printed circuit board, therefore, the circuit can be easily mounted with a degree of freedom in a space between circuit layouts or circuit patterns of the transmission branch 101 and the transmission branch 102. Consequently, high-frequency signal wirings which are connected from the transmission output detectors 161, 162 to the inter-branch error detector 110 can be laid so as to be short, equal in length, and symmetric. A configuration in which the mounting performance is high is obtained.

As a result, detection errors of the amplitude and the phase which may be possibly caused in wirings for extracting a transmission signal can be reduced, and accurate phase and amplitude corrections can be realized. There are resistances against various variations such as variations due to production processes of circuits, variations due to usage environments (for example, the temperature), or variations of the power source voltage during operation. Countermeasures against such variations can be taken, and the amplitude and phase errors can be accurately detected.

Moreover, the configuration of the embodiment where a part of the transmission signal is extracted from each of the transmission branches by the transmission output detectors 161, 162 can avoid a problem which occurs in the configuration of Patent Literature 1 where a transmission signal is extracted by changeover of a switch, and in which the antenna characteristics are changed by an impedance change in changeover of the switch.

Since the amplitude and phase errors of the transmission branches are detected, circuits of a reception system for calibration in which a transmission signal is down-converted to a baseband signal, and then subjected to a receiving process are not necessary. Therefore, increases of the circuit size, the power consumption, and the cost can be suppressed.

The phased array transmission apparatus of the embodiment has the amplitude adjusters 191, 192 as means for individually adjusting the amplitude in each transmission branch. Therefore, the directional side lobe of a transmission beam can be further suppressed as compared with the case where transmission output levels are made uniform by weighting transmission output levels from a plurality of antennas.

As a result, in the phased array transmission apparatus of the embodiment, by calibrating the amplitude and phase adjustments between the transmission branches, it is possible to obtain desired beam directionality, and to suppress degradation of the amount of side lobe suppression. According to the configuration of the embodiment, it is possible to mount additional circuits necessary for calibration with a small size, low cost, and low power, as compared to a configuration of the related art including a reception system in which a transmission signal is down-converted by a mixer. The present configuration is a configuration where the mounting performance is high also in the viewpoints of integration of circuits and mounting of circuits on a printed circuit board.

Second Embodiment

Figure 4:
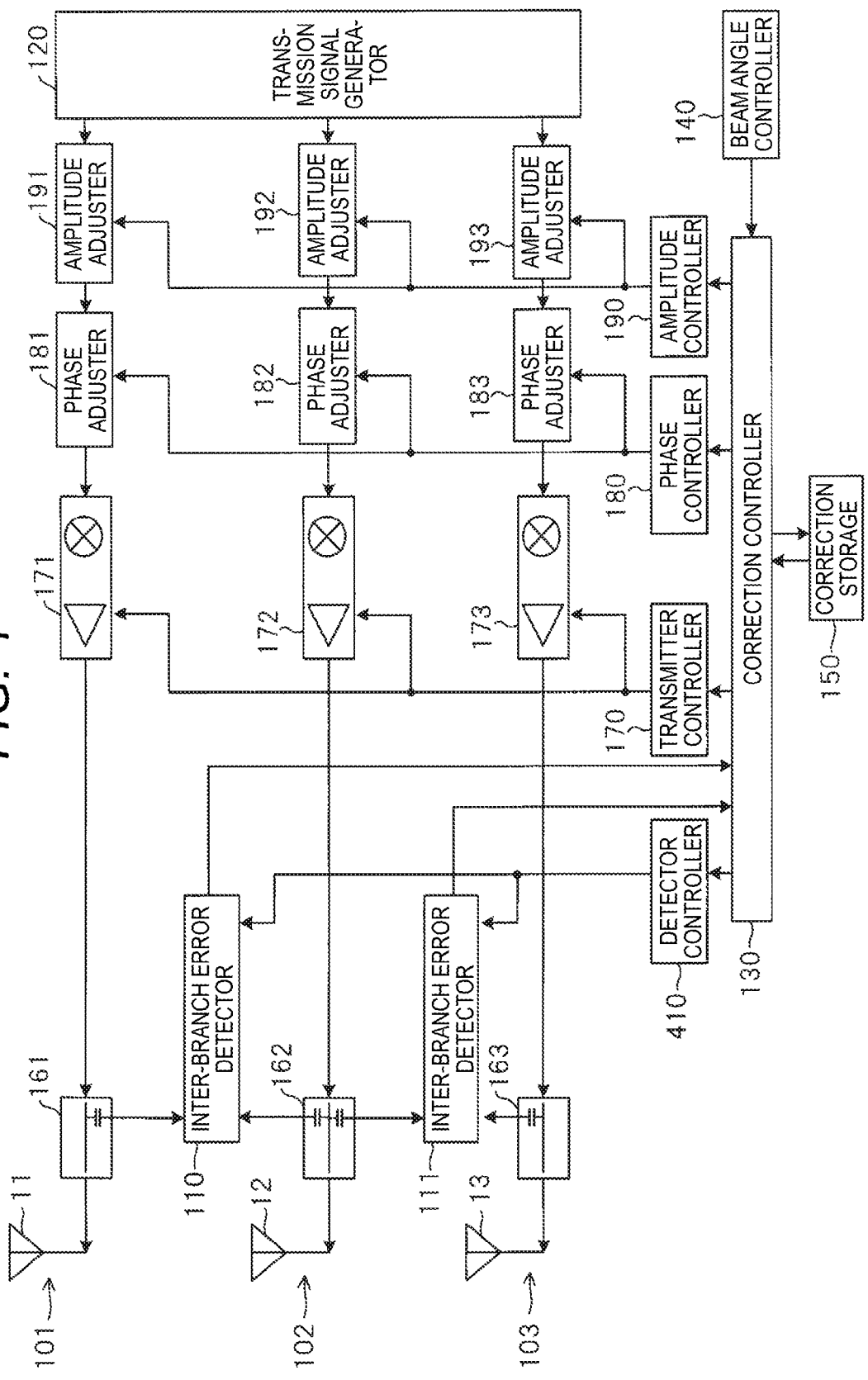
FIG. 4 is a block diagram showing the configuration of a phased array transmission apparatus of a second embodiment of the disclosure.

FIG. 4 is a block diagram showing the configuration of a phased array transmission apparatus of a second embodiment of the disclosure. In the second embodiment, a configuration example will be described in which the configuration of the first embodiment shown in FIG. 1 is basically employed, and the number of transmission branches is three.

The phased array transmission apparatus of the second embodiment has a configuration where a transmission branch 103 is disposed in addition to the transmission branches 101, 102. In the configuration, furthermore, an inter-branch error detector 111, and a detector controller 410 which is connected to the inter-branch error detectors 110, 111 are disposed. The other configuration is similar to that of the first embodiment, and the components which are denoted by the same reference numerals as in FIG. 1 have the identical functions. Therefore, their description will be omitted.

The inter-branch error detector 111 is disposed between the transmission branch 102 and the transmission branch 103, and connected to the transmission output detectors 162, 163 of the transmission branches 102, 103. The inter-branch error detector 111 detects information relating to the output levels (amplitudes) of the transmission signals of the transmission branches 102 and 103, and the phase difference of the two signals, based on the signals supplied from the transmission output detectors 162 and 163, and outputs it as an error detection signal to the correction controller 130. The configuration and operation of the inter-branch error detector 111 are similar to those of the inter-branch error detector 110 which have been described with reference to FIG. 2.

The detector controller 410 controls the inter-branch error detectors 110 and 111 so as to correct errors of the detection characteristics of the inter-branch error detectors which are calculated by the correction controller 130. In order that the inter-branch error detector 110 and the inter-branch error detector 111 obtain the same detection characteristics, for example, the detector controller 410 adjusts the biases of circuits of the detectors which are inside the inter-branch error detectors, and corrects errors of the wave detection characteristics.

The procedure of error correction relating to the phase error and the amplitude error between the transmission branches in the second embodiment will be described. The basic operation of the second embodiment is similar to that of the first embodiment. Here, description will be made with focusing attention on portions different from the first embodiment.

In the second embodiment, in order to correct phase and amplitude errors between the three transmission branches, the phase and amplitude errors between the transmission branches 101 and 102 are detected and corrected with the procedures shown in the first embodiment, and the phase and amplitude errors between the transmission branches 102 and 103 are detected and corrected with the same procedures. In the case where three or more transmission branches are disposed, relative errors between adjacent transmission branches are detected and corrected, whereby mutual phase and amplitude errors between all the transmission branches 101 to 103 are corrected.

In order to attain accurate correction, here, it is important that the inter-branch error detectors 110, 111 have the same error detection characteristics. In the embodiment, the following procedures are performed in order to equalize the wave detection characteristics of the inter-branch error detectors 110, 111.

As a first procedure, the correction controller 130 causes the transmitter controller 170 to control the transmission branches 101, 103 so as to be turned OFF, and the transmission branch 102 to perform the transmission operation. The transmission output detector 162 is designed so that the two outputs to the inter-branch error detectors 110, 111 are equal to each other in level, and the transmission signal of the transmission branch 102 is input at the same level to both the inter-branch error detectors 110, 111.

As a second procedure, the correction controller 130 compares the two error detection signals which are supplied respectively from the inter-branch error detectors 110, 111, with each other, and instructs the detector controller 410 to perform a control so that the two signals become identical to each other. The detector controller 410 adjusts the wave detection characteristics of one or both of the detectors which are inside the inter-branch error detectors 110, 111, by, for example, using the bias, and performs a control so that the two error detection signals which are output respectively from the inter-branch error detectors 110, 111 become identical to each other.

The detectors of the inter-branch error detectors 110, 111 may be initially set in the following manner. For example, the detector controller 410 checks the bias currents of the detectors, and performs the initial setting so that the currents are made identical with each other. Therefore, the wave detection characteristics of detecting circuits in the detectors, i.e., relationships of output wave detection voltage values with respect to the input signal level can be aligned with each other to some extent, and the errors can be decreased before execution of the first procedure.

After the correction is performed in the above-described procedures so that all the inter-branch error detectors have the same wave detection characteristics, the correction controller 130 detects the transmission output levels of the transmission branches in a similar manner as the first embodiment. Namely, the correction controller 130 causes all the transmission branches 101 to 103 to be sequentially operated by the transmitter controller 170, senses the signal levels, detects the output levels of all the transmission branches, compares the transmission output levels of the all transmission branches with one another, and detects the amplitude errors between the transmission branches. Thereafter, the amplitude controller 190 calculates correction values of the amplitude errors of the transmission branches 101 to 103, adjusts the amplitude adjusters 191 to 193 of the transmission branches 101 to 103 by the corrected amplitude control amounts, and corrects the amplitude characteristics.

With respect to the phase errors, similarly with the first embodiment, the phase error amounts between the transmission branches are detected, the correction values of the phase errors are calculated, and the phase adjusters 181 to 183 of the transmission branches 101 to 103 are adjusted by the corrected phase control amounts to correct the phase characteristics.

As described above, according to the second embodiment, in a phased array transmission apparatus using three or more antennas, it is possible to detect errors of the amplitude and phase characteristics between all transmission branches in a similar manner as in the first embodiment, and correct the phase and amplitude errors by simple procedures. According to the configuration, it is possible to realize a phased array transmission apparatus that is a transmission apparatus in which many antennas are controlled to form a beam with higher directionality, and that can perform accurate beam formation.

The configuration described in the embodiment is applicable also to a configuration having four or more transmission branches. In the case where an N number of transmission branches are used, for example, an (N−1) number of inter-branch error detectors are disposed between the transmission branches, and the phase and amplitude errors between adjacent transmission branches are sequentially detected, whereby the errors between the all transmission branches can be known, and corrected in a similar manner.

According to the embodiment, in a phased array transmission system having an N number of transmission branches, it is not required to dispose an inter-branch error detector in all of (N×(N−1)/2) combinations, and it is requested that a smaller number or (N−1) of circuits are disposed. Therefore, errors of the whole phased array transmission system can be corrected by a small configuration in which an increase in circuit size or power consumption is suppressed, and which is easily mounted.

The configuration of FIG. 4 is an asymmetric configuration where the transmission output detector 162 has the two outputs to the inter-branch error detectors 110 and 111, and each of the transmission output detectors 161 and 163 has one output to the inter-branch error detector 110 or 111. The disclosure is not limited to this. No problem in operation arises as far as the apparatus is designed so that, with respect to the same transmission signal level, the levels of all the signals which are extracted to the outputs to transmission output detectors are equal to each other.

In the case where it is difficult from the view point of mounting to design the device so that the outputs of all inter-branch error detectors are equal to each other, a circuit which ideally operates is hardly designed, and detection errors are produced, for example, a configuration where correction is performed in consideration of detection errors may be employed. A design error of a circuit can be previously considered. When a control is performed so that, in consideration of a design error, the correction controller 130 corrects the phase and amplitude errors, or the detector controller 410 corrects the error detection signal, therefore, no problem in operation arises.

Third Embodiment

Figure 5:
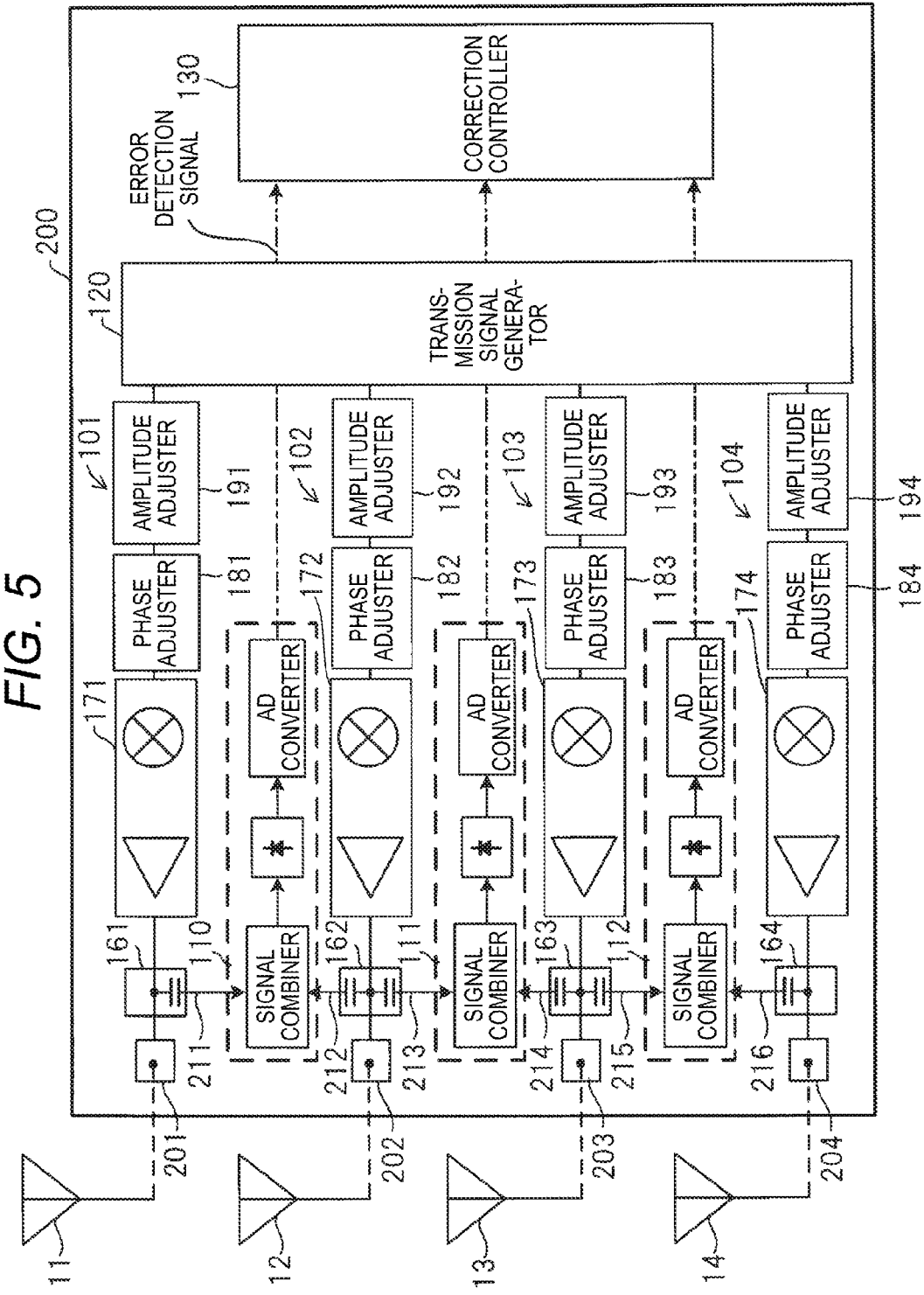
FIG. 5 is a view showing the configuration of an integrated circuit including a phased array transmission apparatus of a third embodiment of the disclosure.

FIG. 5 is a view showing the configuration of an integrated circuit including a phased array transmission apparatus of a third embodiment of the disclosure. In the third embodiment, a configuration example will be described in which circuits of a phased array transmission system having four transmission branches are mounted on an integrated circuit.

In an integrated circuit 200 constituting a phased array transmission apparatus, circuits of four transmission branches 101, 102, 103, 104 are layouted and mounted on a semiconductor chip. Pads 201, 202, 203, 204 are formed in end portions of the transmission branches 101 to 104, respectively. It is configured so that antenna portions 11, 12, 13, 14 are connectable to the pads 201 to 204, respectively. In the illustrated example, the configuration where the antenna portions 11 to 14 are externally disposed, and connected to the pads 201 to 204 is shown. Alternatively, a configuration may be employed where the pads 201 to 204 are not disposed, and the antenna portions 11 to 14 are formed on the semiconductor chip.

Similarly with the first embodiment, the transmission branches 101 to 104 have transmission output detectors 161 to 164, transmitters 171 to 174, phase adjusters 181 to 184, and amplitude adjusters 191 to 194. The inter-branch error detector 110 is placed between the transmission branches 101 and 102, the inter-branch error detector 111 between the transmission branches 102 and 103, and an inter-branch error detector 112 between the transmission branches 103 and 104.

The transmission signal generator 120 and the correction controller 130 are placed in the integrated circuit 200. Although also circuits including the phase controller 180 and the amplitude controller 190 are placed in the integrated circuit 200, their illustration is omitted.

The inter-branch error detectors 110 to 112 in embodiment can be configured in a smaller size by a simple circuit as compared with a receiving circuit which is used in processing of a reception signal, and can be mounted in a small space. When the inter-branch error detectors are layouted between the transmission branches, wirings 211 to 216 elongating from the transmission output detectors 161 to 164 to the inter-branch error detectors 110 to 112 can be shortened.

The avoidance of laying of wirings enables a layout design (wiring) in which parasitic elements (electrical couplings) with other circuits and wirings are reduced, to be performed. The lengths of the wirings elongating from the transmission branches 101 to 104 to the inter-branch error detectors 110 to 112 can be made equal to each other. As a result, the number of parasitic elements is small, and the phase and amplitude changes of a signal are identical in the wirings. Therefore, amplitude and phase errors due to laying of wirings can be reduced, and accurate correction can be attained.

In an integrated circuit, when parasitic elements are produced in wirings, it causes the phase and amplitude of a signal to be changed, and detection errors are produced in the amplitude and the phase. In an assumed configuration where, as in the related art examples, one reception system for calibration is disposed, and transmission outputs of transmission branches are received and detected, a receiving section is placed in any one place of an integrated circuit. The outputs of the transmission branches are connected to the receiving section while wirings are laid to the input of the receiving section which is disposed in the one place. Therefore, it is difficult to obtain phase and amplitude changes of particularly a high-frequency signal due to wirings, with the same characteristics. Consequently, it is difficult to distinguish errors due to the wirings from those residing in the transmission branches, and there arises a problem in that accurate calibration is hardly performed.

In the embodiment, by contrast, the wirings to the inter-branch error detectors between the transmission branches can be made short and equal in length to each other, and therefore errors due to the wiring layout of the circuits can be suppressed to the minimum. The error detection signals which are transmitted between the inter-branch error detectors 110 to 112 and the correction controller 130 are digital signals indicating a wave detection level, and not high-frequency signals. Even when wirings are long, therefore, there arises no problem, and there is no restriction of equal length.

In the phased array transmission apparatus of the disclosure, as described above, phase and amplitude errors between the transmission branches are corrected, whereby an accurate transmission beam can be formed, the directionality gain of the main beam direction is improved, and the radiation level in an unwanted direction can be suppressed. With respect to the target accuracies of phase and amplitude errors, in the case where the acceptable amount of degradation of the side lobe suppression level is set to 3 dB, for example, accuracies in which the amplitude error is 1 dB or smaller, and the phase error is 5 deg. or smaller must be ensured. When the configuration of the embodiment is applied, it is possible to sufficiently cope with the requirement. Therefore, it is effective to control a communication area in wireless communication, to improve link budget, or to suppress clutter reflection or multipath in an unwanted direction in a radar to enhance the detection accuracy.

In the phased array transmission apparatus of the disclosure, moreover, it is possible to mount the inter-branch error detector which detects errors, by a simple circuit. Thus, it is possible to realize low power consumption of the circuit, and it is easy to secure a transmission signal of a high frequency such as a millimeter-wave band. The apparatus can be applied to a system which uses a high frequency.

In application to the high-frequency band, circuit portions which process a high-frequency signal, such as the inter-branch error detectors and the transmission output detectors can be mounted by using circuits which are highly suitable for integration, and the whole system can be mounted in a small size. Also in the case where variations occur in circuits for error detection such as the inter-branch error detectors to cause correction errors, moreover, the circuits for error detection themselves can be corrected, and accurate error correction of the amplitude and the phase can be realized as the whole system.

As various modes of the embodiments of the disclosure, the followings are included.

The phased array transmission apparatus of the first disclosure includes first and second transmission branches each having: a transmitter which transmits a transmission signal at a radio frequency; a phase adjuster which adjusts a phase of the transmission signal; an amplitude adjuster which adjusts an amplitude of the transmission signal; and a transmission output detector which extracts a part of an output of the transmitter, and the apparatus further includes: an inter-branch error detector including: a signal combiner which combines outputs of the transmission output detectors of the first transmission branch and the second transmission branch, with each other; a detector which detects a level of an output of the signal combiner; and an AD converter which converts an analog voltage from the detector into a digital value; a correction controller which detects phases and amplitudes of the first transmission branch and the second transmission branch according to an output from the inter-branch error detector; a phase controller which controls the phase adjuster based on a result of phase detection by the correction controller; and an amplitude controller which controls the amplitude adjuster based on a result of amplitude detection by the correction controller.

According to the configuration, phase and amplitude errors of transmission signals between transmission branches can be accurately corrected by the configuration which is configured by simple circuits that can suppress an increase of the circuits or power consumption, and that can take countermeasures against variations, and which provides high mounting performance, and it is possible to form an accurate transmission beam in a phased array antenna.

In the phased array transmission apparatus of the second disclosure, in the phased array transmission apparatus of the first disclosure, the correction controller controls the phase controller to change the phase adjuster of at least one of the first transmission branch and the second transmission branch, thereby changing a phase between the two transmission branches over 360 deg., detects two phase values at which an output of the inter-branch error detector has a preset reference value, and calculates a phase error as a phase value at which a median value between the two phase values is in-phase and reverse-phase conditions of a phase difference between the first and second transmission branches, and the phase controller adjusts the phase adjusters of the first and second transmission branches based on the phase error which is calculated by the correction controller, thereby correcting the phase error between the two transmission branches.

In the phased array transmission apparatus of the third disclosure, in the phased array transmission apparatus of the first or second disclosure, the apparatus includes a transmitter controller which controls an operation of the transmitter, the correction controller controls the transmitter controller to cause one of the first and second transmission branches to operate, detects transmission output levels of the first transmission branch and the second transmission branch according to the output of the inter-branch error detector, and calculates an amplitude error between the first and second transmission branches, and the amplitude controller adjusts the amplitude adjusters of the first and second transmission branches based on the amplitude error which is calculated by the correction controller, thereby correcting the amplitude error between the two transmission branches.

In the phased array transmission apparatus of the fourth disclosure, in the phased array transmission apparatus of any one of the first to third disclosures, the apparatus includes a correction storage which stores information relating to results of the phase and amplitude detections by the correction controller, the correction storage stores: a phase correction table having a correction value or phase control values for correcting a phase error in each of the first and second transmission branches; and an amplitude correction table having a correction value or amplitude control value for adjusting an amplitude error in each of the first and second transmission branches, and the correction controller produces or updates the phase correction table and the amplitude correction table, adjusts the phase controller according to the correction value or phase control value of the phase correction table, and adjusts the amplitude controller according to the correction value or amplitude control value of the amplitude correction table.

In the phased array transmission apparatus of the fifth disclosure, in the phased array transmission apparatus of the first disclosure, the apparatus includes three or more transmission branches including the first and second transmission branches, while setting two of the three or more transmission branches as the first and second transmission branches, the apparatus includes an inter-branch error detector including the signal combiner, the detector, and the AD converter, between the first and second transmission branches, and the correction controller performs adjustment so that detection characteristics of a plurality of the inter-branch error detectors become identical with other.

In the phased array transmission apparatus of the sixth disclosure, in the phased array transmission apparatus of the fifth disclosure, the apparatus includes: an N number of transmission branches including the first and second transmission branches; and an (N−1) number of the inter-branch error detectors which are connected respectively between the N number of transmission branches.

In the phased array transmission apparatus of the seventh disclosure, in the phased array transmission apparatus of the fifth or sixth disclosure, the apparatus includes: a transmitter controller which controls an operation of the transmitter; and a detector controller which adjusts wave detection characteristics of the detector, and, in a case where the detection characteristics of the plurality of inter-branch error detectors are to be adjusted, the correction controller controls the transmitter controller to cause a transmission branch to operate, the transmission branch being connected to both the plurality of inter-branch error detectors of adjustment objects, and the detector controller adjusts the detection characteristics of the detectors of the plurality of inter-branch error detectors so that outputs of the plurality of inter-branch error detectors become equal to each other.

The integrated circuit of the eighth disclosure includes the phased array transmission apparatus of any one of the first to seventh disclosures, and an inter-branch error detector including the signal combiner, the detector, and the AD converter is placed between the first transmission branch and the second transmission branch.

Although various embodiments have been described with reference to the drawings, it is a matter of course that the disclosure is not restricted to the examples. It is obvious to those skilled in the art that various changes and modifications can be made within the scope of the appended claims, and it is to be understood that they naturally belong to the technical scope of the disclosure. Furthermore, components of the embodiments may be arbitrarily combined with one another without departing from the spirit of the disclosure.

The application is based on Japanese Patent Application (No. 2013-052224) filed Mar. 14, 2013, and the contents of which are incorporated herein by reference.

INDUSTRIAL APPLICABILITY

The disclosure has an effect that phase and amplitude errors of a transmission signal between transmission branches can be corrected by a simple configuration which is easily mounted. The phased array transmission apparatus of the disclosure can realize an accurate formation of a beam in which a side lobe is suppressed, with a small size, low cost, and low power consumption as compared to the related art, and is useful in a transmission apparatus (for example, a base station) in a wireless communication system in which beam formation is necessary, a radar apparatus in which the detection accuracy is enhanced by beam formation, a radio chip which realizes these, or the like.

REFERENCE SIGNS LIST 11, 12, 13, 14 antenna portion
101, 102, 103, 104 transmission branch
110, 111, 112 inter-branch error detector
120 transmission signal generator
130 correction controller
140 beam angle controller
150 correction storage
161, 162, 163, 164 transmission output detector
170 transmitter controller
171, 172, 173, 174 transmitter
180 phase controller
181, 182, 183, 184 phase adjuster
190 amplitude controller
191, 192, 193, 194 amplitude adjuster
210 signal combiner
220 detector
230 AD converter
410 detector controller

The invention claimed is:

1. A phased array transmission device, comprising:
    an N (N≥3) number of transmission branches including a first transmission branch and a second transmission branch, the second transmission branch being adjacent to the first transmission branch, each having:
        a transmitter which transmits a transmission signal at a radio frequency;
        a phase adjuster which adjusts a phase of the transmission signal;
        an amplitude adjuster which adjusts an amplitude of the transmission signal; and
        a transmission output detector which extracts a part of an output of the transmitter;
    an (N−1) number of inter-branch error detectors, which detect relative errors between adjacent transmission branches, each including:
        a signal combiner which combines outputs of the transmission output detectors of the adjacent transmission branches with each other;
        a detector which detects a level of an output of the signal combiner; and
        an AD converter which converts an analog voltage from the detector into a digital value;
    a correction controller which detects phases and amplitudes of the transmission branches according to outputs from the inter-branch error detectors;
    a phase controller which controls the phase adjuster based on a result of phase detection by the correction controller; and
    an amplitude controller which controls the amplitude adjuster based on a result of amplitude detection by the correction controller.

2. The phased array transmission device according to claim 1, further comprising:
    a transmitter controller which controls an operation of the transmitter,
    wherein the correction controller controls the transmitter controller to cause one of the first and second transmission branches to operate, detects transmission output levels of the first transmission branch and the second transmission branch according to the output of one of the inter-branch error detectors, and calculates an amplitude error between the first and second transmission branches; and
    wherein the amplitude controller corrects the amplitude error between the first and second transmission branches by adjusting the amplitude adjusters of the first and second transmission branches based on the amplitude error which is calculated by the correction controller.

3. The phased array transmission device according to claim 1, further comprising:
    a correction storage which stores information relating to results of the phase and amplitude detections by the correction controller,
    wherein the correction storage stores:
        a phase correction table having a correction value or phase control value for correcting a phase error in each of the first and second transmission branches; and
        an amplitude correction table having a correction value or amplitude control value for adjusting an amplitude error in each of the first and second transmission branches; and
    wherein the correction controller produces or updates the phase correction table and the amplitude correction table, adjusts the phase controller according to the correction value or phase control value of the phase correction table, and adjusts the amplitude controller according to the correction value or amplitude control value of the amplitude correction table.

4. The phased array transmission device according to claim 1,
    wherein the correction controller performs adjustment so that detection characteristics of a plurality of the inter-branch error detectors become identical with other.

5. The phased array transmission device according to claim 4, comprising:
    a transmitter controller which controls an operation of the transmitter; and
    a detector controller which adjusts wave detection characteristics of the detector,
    wherein in a case that the detection characteristics of the plurality of inter-branch error detectors are to be adjusted, the correction controller controls the transmitter controller to cause a transmission branch to operate, the transmission branch being connected to both the plurality of inter-branch error detectors of adjustment objects, and the detector controller adjusts the detection characteristics of the detectors of the plurality of inter-branch error detectors so that outputs of the plurality of inter-branch error detectors become equal to each other.

6. An integrated circuit comprising:
    the phased array transmission device of claim 1; and
    the inter-branch error detectors are respectively provided between adjacent transmission branches.

7. A phased array transmission device, comprising:
a first transmission branch and a second transmission branch, each having:
   a transmitter which transmits a transmission signal at a radio frequency;
   a phase adjuster which adjusts a phase of the transmission signal;
   an amplitude adjuster which adjusts an amplitude of the transmission signal; and
   a transmission output detector which extracts a part of an output of the transmitter;
an inter-branch error detector including:
   a signal combiner which combines outputs of the transmission output detectors of the first transmission branch and the second transmission branch, with each other;
   a detector which detects a level of an output of the signal combiner; and
   an AD converter which converts an analog voltage from the detector into a digital value;
a correction controller which detects phases and amplitudes of the first transmission branch and the second transmission branch according to an output from the inter-branch error detector;
a phase controller which controls the phase adjuster based on a result of phase detection by the correction controller; and
an amplitude controller which controls the amplitude adjuster based on a result of amplitude detection by the correction controller, wherein the correction controller controls the phase controller to change the phase adjuster of at least one of the first transmission branch and the second transmission branch, thereby changing a phase between the first and second transmission branches over 360 degrees, detects two phase values at which an output of the inter-branch error detector has a preset reference value, and calculates a phase error as a phase value at which a median value between the two phase values is in-phase and reverse-phase conditions of a phase difference between the first and second transmission branches; and
wherein the phase controller adjusts the phase adjusters of the first and second transmission branches based on the phase error which is calculated by the correction controller, thereby correcting the phase error between the two transmission branches.

* * * * *